United States Patent [19]
Brunner et al.

[11] Patent Number: 4,710,999
[45] Date of Patent: Dec. 8, 1987

[54] DEVICE FOR CLEANING SHELLFISH

[76] Inventors: Josef Brunner, A-6322, Niederbreitenbach 156; Josef Ritzer, Schwaige 28a, A-6344 Walchsee, both of Fed. Rep. of Germany

[21] Appl. No.: 855,816
[22] PCT Filed: Jul. 5, 1985
[86] PCT No.: PCT/DE85/00232
§ 371 Date: May 7, 1986
§ 102(e) Date: May 7, 1986
[87] PCT Pub. No.: WO86/00500
PCT Pub. Date: Jan. 30, 1986

[30] Foreign Application Priority Data
Jul. 13, 1984 [DE] Fed. Rep. of Germany ....... 3425884
Jan. 11, 1985 [DE] Fed. Rep. of Germany ....... 3500787

[51] Int. Cl.$^4$ .............................................. A22C 29/00
[52] U.S. Cl. ...................................................... 17/65
[58] Field of Search .............. 17/53, 64, 65, 71, 74, 17/47, 51; 99/626, 631; 83/437; 241/277

[56] References Cited
U.S. PATENT DOCUMENTS

| 26,991 | 1/1860 | Hope | 83/437 X |
| 826,896 | 7/1906 | Shaver | 241/277 |
| 859,842 | 7/1907 | Robinson | 99/631 |
| 1,779,046 | 10/1930 | McNaney | 17/53 X |
| 2,407,819 | 9/1946 | Dolan | 99/626 |

FOREIGN PATENT DOCUMENTS 469506 12/1928 Fed. Rep. of Germany .......... 17/65

Primary Examiner—Willie G. Abercrombie
Attorney, Agent, or Firm—Bernard, Rothwell & Brown

[57] ABSTRACT

A device for cleaning shellfish consists of a chamber having two opposed brush disks, relatively moveable toward one another and at least one of the disks is rotatably driven.

24 Claims, 3 Drawing Figures

DEVICE FOR CLEANING SHELLFISH

The invention relates to a device for cleaning shellfish, such as mussels, oysters and/or scallops.

When they are gathered, produced or harvested, shellfish are coated externally with colonies and deposits of lower organisms, such as algae and other such organisms, organic substances, such as mud and silt, and mineral substances, such as chalk and other incrustations. Before they are processed for consumption, or alternatively before consumption, they must therefore be cleaned.

According to the prior art, cleaning occurred previously be means of a process of brushing or scratching the undesired material off by hand. Being very time-consuming, this operation, because of its wage-intensive nature, is very costly. Because of the length of time and high costs involved, there was, more particularly in the hotel trade and in "haute cuisine" restaurants, an increasing tendency to refrain from offering such small shellfish.

In order to make it possible to offer shellfish in spite of the above and to reduce the costs incurred in cleaning them, there has also been a changeover to the practice of cleaning shellfish chemically. This entailed immersing the shellfish in a cleansing lye, and stirring them around at varying intervals in this cleansing lye in order to allow the cleansing lye to reach all parts of the outer surface of the shellfish. Even if the shellfish are rinsed off with water after such chemical cleaning, considerable doubts nonetheless exist regarding this cleaning method from the point of view of foodstuffs legislation and that of keeping the foodstuffs free from harmful substances, apart from the fact that it is impossible to avoid impairing the taste.

The invention is based on the task of creating a device for cleaning shellfish allowing for a cleaning operation which does not involve substantial labour and personnel costs, which is therefore inexpensive and thus makes it possible once again to offer shellfish for consumption and enjoyment at an acceptable price, and which is characterized by the absence of any active chemical ingredients. According to the invention, this task is solved by means of a device which is provided with a chamber designed to accommodate a quantity of shellfish, two approximately opposite walls of the chamber comprising brush wheels which can be moved in their planes in relation to one another, at least one of the brush wheels being provided with a motor, and one input and one output port being provided for rinsing fluid, or else—as an alternative—instead of one of the brush wheels, or instead of at least one of its bristle-bearing sections, rolling elements are provided, having working surfaces longitudinal to the other brush wheel, it being possible for the rolling elements to consist of rubber fingers, flexible fingers and/or blades/shovels. It is contrived by virtue of this arrangement that, as a consequence of the relative motion of the brush wheels, or alternatively of the brush wheel on the one hand and the brush sections and rolling elements on the other hand, the shellfish are circulated and rubbed against one another and simultaneously brushed off in quantities and thus, as has already been proved in practice, cleaned very intensively. Practically only pure water, such as drinking water, is suitable for use as rinsing fluid, which serves only to rinse off and away loosened impurities. Seawater can, of course, also be used, in some cases advantageously. In the case of mussels, the device can also serve, through the action of the bristles, to remove the greater part of the so-called beards, a process which it has hitherto been necessary to carry out by hand for each individual mussel.

In the case of embodiments according to the invention, the brush wheels, or alternatively the one brush wheel and the rolling elements, are mounted in such a way that they can be moved up and down in relation to one another and are subjected to pressure, or alternatively one of the brush wheels, having freedom of movement in the vertical plane, acts on the other brush wheel under the force of gravity, serving further to increase the brushing, frictional and rotating effect of the device.

A further increase in the effectiveness of the device according to the invention is achieved by arranging sections with various bristle lengths alternately on at least one of the brush wheels, and arranging these sections of varying bristle lengths alternately, predominantly in the direction of (relative) motion.

Advantageous embodiments of the device are characterized in that the length of the relatively short bristles is 1–2 cm and the length of the relatively long bristles exceeds the length of the short bristles by approximately 1 cm, and/or that the bristles are made from a corrosion-resistant material, and preferably from a brass.

A variation on the device is characterized by an embodiment according to the invention of simple design, the brush wheels, or, where applicable, a wheel bearing the rolling elements, being designed essentially as rotating bodies, the cylindrical space thus existing between the brush wheels being enclosed by a hollow cylindrical sleeve, forming the chamber laterally, with clearance in relation to the brush wheels, and the motor being a three-phase AC motor. Thus, the device is designed advantageously in such a way that—in the operational position—it exhibits a vertical axis, that the lower brush wheel is motor-driven and that the upper brush wheel is guided by means of a non-turn, vertical slide arrangement and—for the purpose of loading and removing the shellfish—can be removed from above, and further such that the sections are designed and disposed in a sector formation with short and long bristles.

In a further embodiment of such a device according to the invention, at least one of the brush wheels exhibits at its edge a crown-shaped section having bristles longer than the other bristles, with the result that shellfish arriving at the edge of the brush wheel are moved upwards and further inwards.

In the case of a device in which the chamber takes the form of a hollow cylinder and the brush wheels are designed essentially as rotating bodies, the cylindrical inner wall is fitted, according to the invention and to particular advantage, with bristles, and/or the motor-driven brush wheel is driven alternately in a clockwise and counter-clockwise direction. These measures make it possible to clean the shellfish more intensively and therefore in some circumstances more quickly, the first of them in particular having proved especially effective in removing the beards when cleaning mussels.

In embodiments according to the invention the brushes are arranged on a hollow cylindrical assembly, which is divided advantageously and comprises a number of hollow cylindrical inserted sections, preferably three inserted sections. This particular measure facilitates the manufacture, cleaning and replacement of the bristle holder. Finally, it is also possible by this means to fit bristle holders and/or inserted sections with various bristle arrangements in order to clean the shellfish.

Furthermore, in order to fix the inserted sections, ribs are disposed on the inner drum wall, at least one of which advantageously contains an axially disposed guide groove designed to accommodate on anti-turn device, which is located on the removable brush wheel.

In the case of direct drive, the motor can advantageously be driven in both directions alternately.

Moreover, it is proposed that the brush wheel is rotated at a speed of 100–300 n/min. and further, that the input port for the rinsing fluid comprises a jet which is directed into the chamber and that this jet acts in a direction opposite to the direction of rotation of the motor-driven brush wheel in each case, the jet pointing in a basically tangential direction, and finally that the motor is fitted with an adjustable time switch.

The drawing illustrates schematically the essence of the invention with reference to different embodiments.

Figure 1:
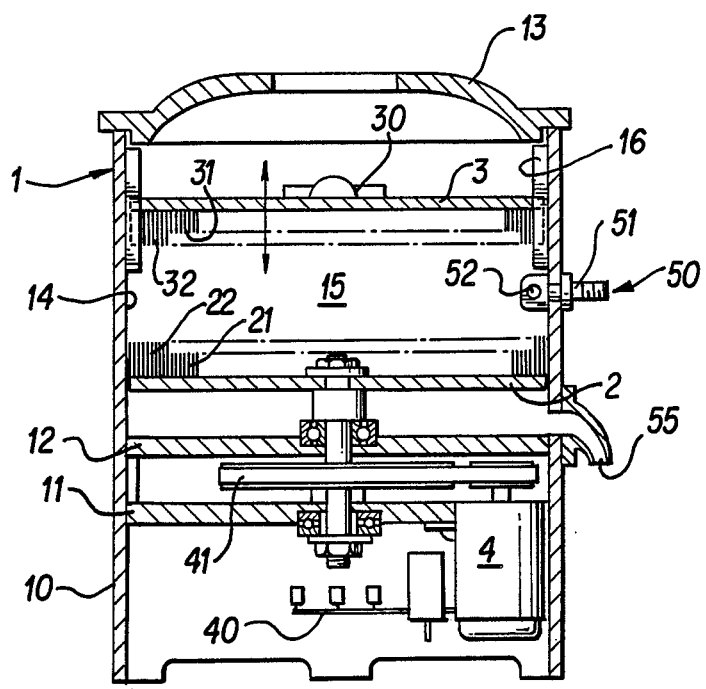
FIG. 1 is a lateral, sectional view of a device for cleaning shellfish
Figure 2:
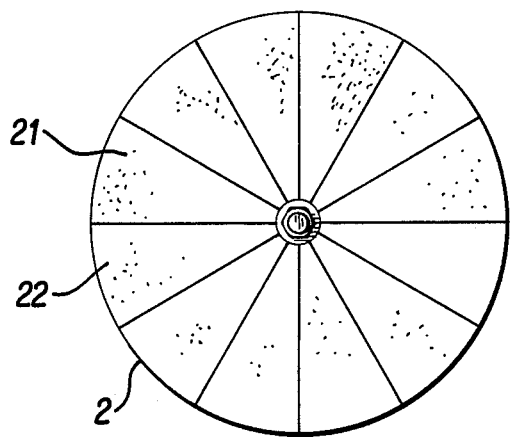
FIG. 2 is a top view of the lower brush wheel of the device.

According to FIGS. 1 and 2, a device for cleaning shellfish comprises a drum-shaped housing 1 having a hollow cylindrical sleeve 10, two bases 11 and 12 and a removable cover 13, basically comprising, however, a chamber 15 designed to accommodate a quantity of shellfish, two opposite walls of which are designed as rotating bodies, and can be moved in their planes in relation to one another, and the chamber 15 being enclosed laterally, with clearance in relation to brush wheels 2 and 3, by a hollow cylindrical sleeve in the form of the inner wall 14 of the housing 1. The lower brush wheel 2 is driven by a motor 4, having switching elements 40, via a V-belt drive 41. The upper brush wheel 3 is guided vertically in an axial direction (arrows) in guide rails 16 and can be removed from the housing 1 from above by means of its hand grip 30. The device is further provided with an input port 50, having a connector nipple 51 and a jet 52, and an output port 55 for the rinsing fluid, this being pure water.

Sections having different bristle lengths are disposed on the brush wheels 2 and 3, sections 21, 31 being designed and arranged in a sector formation with short bristles and sections 22, 32 with comparatively long bristles, alternating in the direction of movement/rotation (FIG. 2).

In order to clean the shellfish, a quantity of these are loaded into the chamber 15 and the rinsing-mechanism and the motor 4 are actuated. The brush wheel 3 rests with its own weight on the shellfish. These are now rotated briskly and brushed off as a result of the relative motion of brush wheels 2 and 3, and, in the case of mussels, the boards are removed.

Figure 3:
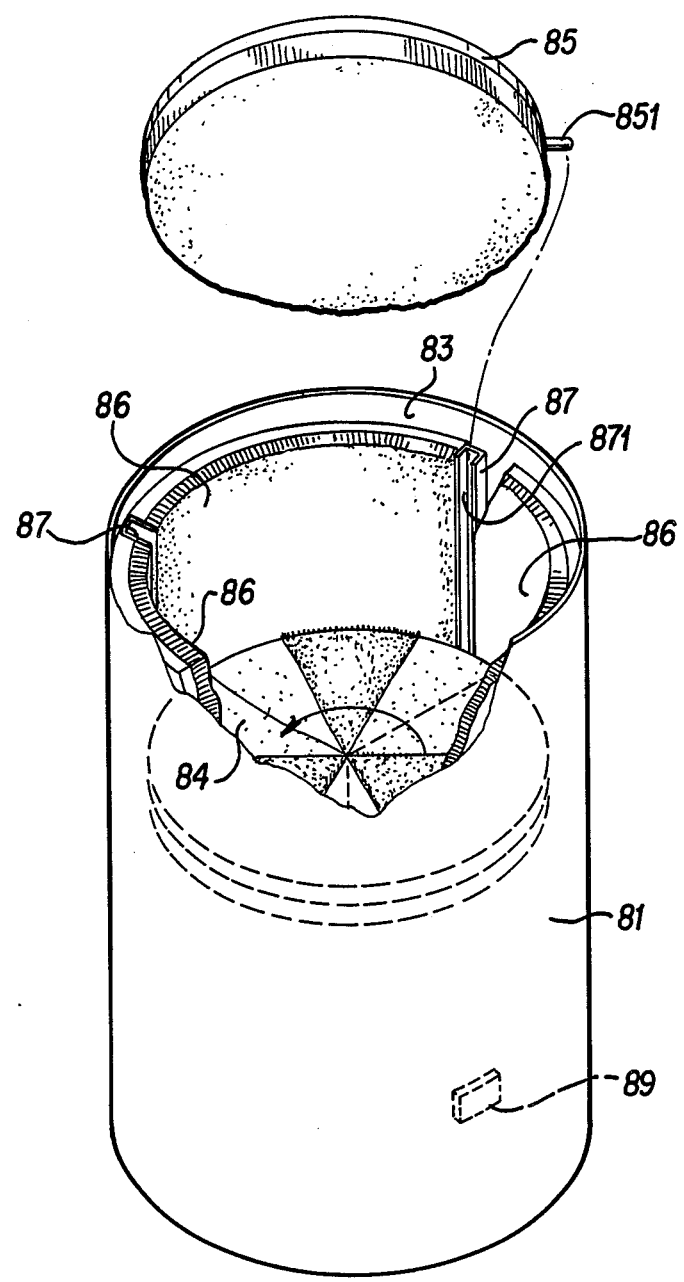
FIG. 3 is a perspective view of another device for cleaning shellfish.

According to FIG. 3, a drum-shaped housing 81 contains a hollow cylindrical chamber 82, also referred to as the cleaning chamber, which next to its cylindrical inner drum wall 83 is enclosed or can be enclosed by a brush wheel 84 and a brush wheel 85—shown in a raised position.

The inner drum wall 83 is fitted with bristles, more particularly in the form of a hollow cylindrical assembly, this being divided up into hollow cylindrical inserted sections, which are fitted with bristles and held in a circumferential direction by means of ribs 87, disposed on the inner drum wall 83. The ribs 87 incorporate guide grooves 871 for an anti-turn device 851, which is mounted on the brush wheel 85.

The lower area of the device (shown in part only) contains a motor for the brush wheel 84, the requisite switching elements, including an interval switch 89 for alternating operation in both directions of rotation, viz. of the motor and thus of the brush wheel 84.

The inserted sections 86 are pushed in between the ribs 87 from above. They are therefore easily retracted from above, facilitating cleaning and/or replacement as applicable.

The rinsing fluid is understood to be clean water, such as mains, i.e. fresh water or else sea, i.e. salt, water, which is fed in a manner which is not described further through the chamber 82, it being possible to mount the input port as a jet in the lower part of a rib 87. The bristle panel of the brush wheel 84 can in a similar manner to that of inserted sections 86 be composed in a sector formation of sections provided with corresponding mounts.

It is understood that a great many different embodiments are possible within the conception of the invention. Thus the brush arrangement can be made up of a backwards- and forwards-moving carriage, or else of a number of different individual brushes, moved in opposing directions, or at least in different fashions. The corrosion-resistant material from which the bristles are made can be stainless steel wire, straight brace wire, or else plastic, such as polyamide, the use of natural bristles not being excluded.

We claim:

1. Device for cleaning shellfish comprising a chamber (15) for accommodating a quantity of shellfish, the chamber having two approximately opposite walls that are comprised of substantially planar, bristle-bearing brush wheels (2,3) which can be moved in their planes in relation to one another, at least one of the brush wheels (2) being equipped with a motor (4) for rotation thereof relative to the other brush wheel, the chamber including at least one input port (50) and one output port (55) for a rinsing fluid.

2. Device as per claim 1, wherein one of the brush wheels is further comprised of rolling elements having working surfaces longitudinal to the other brush wheel.

3. Device as per claim 1 or claim 2, characterized in that the brush wheels (2,3) can be forced towards each other under pressure.

4. Device as per claim 3, characterized in that one of the brush wheels (3), having freedom of movement in a vertical plane, acts on the other brush wheel (2) under the force of gravity.

5. Device as per claim 1, further including sections (21,31; 22,32) of varying bristle lengths that are arranged alternately on at least one of the brush wheels (2,3).

6. Device as per claim 5, characterized in that the sections (21,31; 22,32) of varying bristle lengths are arranged alternately, predominantly in the direction of relative motion.

7. Device as per claim 5 or claim 6, characterized in that the length of the relatively short bristles is 1—2 cm and the length of the relatively long bristles exceeds the length of the short bristles by approximately 1 cm.

8. Device as per claim 1 wherein at least one of the brush wheels includes bristles that are made from a corrosion-proof material.

9. Device as per claim 1, characterized in that the brush wheels (2,3) are rotating bodies that provide a cylindrical space between the brush wheels (2,3) that is enclosed by a hollow cylindrical sleeve (inner wall 14), forming the chamber (15) laterally, with clearance in relation to the brush wheels (2,3), and that the motor (4) is a three-phase AC motor.

10. Device as per claim 9, characterized in that in an operational position the device has a vertical axis, that the lower brush wheel (2) is motor-driven and that the upper brush wheel (3) is guided by means of a non-turn, vertical slide arrangement and can be removed from above for loading and removing shellfish from the chamber.

11. Device as per claim 9, characterized in that the sections with short bristles (21) and the sections with long bristles (22) are designed and disposed in a sector formation.

12. Device as per claim 9 or claim 11, characterized in that at least one of the brush wheels exhibits at its edge a crown-shaped section having bristles longer than the other bristles.

13. Device as per claim 9, wherein the chamber is further defined by a cylindrical inner drum wall (83) that is fitted with bristles.

14. Device as per claim 13, characterized in that the motor-driven brush wheel (84) is at intervals driven alternately in a clockwise and counter-clockwise direction.

15. Device as per claim 13, characterized in that the bristles are arranged on a hollow cylindrical assembly.

16. Device as per claim 15, characterized in that the hollow cylindrical assembly is divided and is comprised of a number of hollow cylindrical inserted sections (86).

17. Device as per claim 16, characterized in that ribs (87) are disposed on the inner drum wall (83) in order to fix the inserted sections (86).

18. Device as per claim 17, further including an anti-turn device located on the removable brush wheel, wherein at least one of the ribs (87) contains a radially disposed guide groove (871) to accommodate the anti-turn device.

19. Device as per claim 9, characterized in that the motor can be driven in both directions alternately by means of an interval switch (89).

20. Device as per claim 9, characterized in that the motor-driven brush wheel (2) is rotated at a speed of 100–300 n/min.

21. Device as per claim 1, characterized in that the input port (50) for the rinsing fluid comprises a jet (52) which is directed into the chamber (15), and that this jet (52) acts in a direction opposite to the direction of motion of the motor-driven brush wheel (2).

22. Device as per claim 21, characterized in that the jet (52) essentially points in a tangential direction.

23. Device as per claim 1, characterized in that the motor (4) is fitted with an adjustable time switch.

24. Device for cleaning shellfish comprising a chamber for accommodating a quantity of shellfish, the chamber having two approximately opposite walls, one of said walls being comprised of a substantially planar, bristle-bearing brush wheel, the other of said walls being comprised of a substantially planar, rolling element-bearing wheel, the rolling elements having working surfaces longitudinal to said brush wheel, the planar wheels comprising said opposite walls being movable in their planes in relation to one another, at least one of the wheels being equipped with a motor for rotation thereof, the chamber including at least one input port and one output port for rinsing fluid.

* * * * *